US012702126B2

(12) United States Patent
Fryers et al.

(10) Patent No.: US 12,702,126 B2
(45) Date of Patent: Aug. 11, 2026

(54) SYSTEM FOR DISPENSING A PEST ATTRACTANT OR REPELLENT, CORRESPONDING REFILL AND METHOD

(71) Applicant: SPOTTA LIMITED, Cambridge (GB)

(72) Inventors: Robert Fryers, Cambridge (GB); Neil D'Souza-Mathew, Cambridge (GB); Gareth Funk, Cambridge (GB); Paris Thomas, Cambridge (GB); Aidan Thomas, Cambridge (GB)

(73) Assignee: SPOTTA LIMITED, Cambridge (GB)

( * ) Notice: Subject to any disclaimer, the term of this patent is extended or adjusted under 35 U.S.C. 154(b) by 297 days.

(21) Appl. No.: 18/025,313

(22) PCT Filed: Sep. 1, 2021

(86) PCT No.: PCT/GB2021/052255

§ 371 (c)(1), (2) Date: Mar. 8, 2023

(87) PCT Pub. No.: WO2022/053781

PCT Pub. Date: Mar. 17, 2022

(65) Prior Publication Data

US 2023/0337653 A1 Oct. 26, 2023

(30) Foreign Application Priority Data

Sep. 9, 2020 (GB) ..................................... 2014166

(51) Int. Cl.

| | |
|---|---|
| ***A01M 1/02*** | (2006.01) |
| ***A01M 13/00*** | (2006.01) |
| ***A01M 29/12*** | (2011.01) |

(52) U.S. Cl.

CPC .............. *A01M 13/00* (2013.01); *A01M 1/02* (2013.01); *A01M 29/12* (2013.01)

(58) Field of Classification Search

CPC ... A61L 9/04; A61L 9/12; A61L 9/127; A61L 2209/131; A61L 9/037; A61L 2209/11;

(Continued)

(56) References Cited

U.S. PATENT DOCUMENTS 4,967,940 A * 11/1990 Blette .................. B67D 7/0216 417/474
5,316,452 A 5/1994 Bogen et al.

(Continued)

FOREIGN PATENT DOCUMENTS

CN 201406308 Y 2/2010
EP 0722742 A2 7/1996

(Continued)

OTHER PUBLICATIONS

Combined Search and Examination Report issued in UK Application No. GB2014166.9, mailed Nov. 6, 2020, 7 pages.

(Continued)

*Primary Examiner* — Arthur O. Hall
*Assistant Examiner* — Juan C Barrera
(74) *Attorney, Agent, or Firm* — Talem IP Law, LLP

(57) ABSTRACT

A system for dispensing a pest attractant or repellent into a surrounding environment, comprising: a main reservoir for storing a fluid; a control volume coupled to the main reservoir, a first flow restrictor arranged to regulate a flow of the fluid between the main reservoir and the control volume; a second flow restrictor arranged to regulate a flow of the fluid out of the control volume; and, an evaporation medium positioned at or downstream of the first flow restrictor, wherein at least one of the first and the second flow restrictors is a controllable flow restrictor, and wherein the system further comprises electronically controllable actuation means for actuating the controllable flow restrictor.

21 Claims, 10 Drawing Sheets

(58) Field of Classification Search

CPC ........ A01M 13/00; A01M 1/02; A01M 29/12; A01M 1/2055; A01M 1/2022; A01M 1/2027; A01M 1/2044; B05B 17/0684; F16K 7/02; F16K 7/04; F16K 7/065; F16K 7/066

USPC .......................................... 239/34–60; 251/7

See application file for complete search history.

(56) References Cited

U.S. PATENT DOCUMENTS

| | | | | |
|---|---|---|---|---|
| 5,810,253 | A | 9/1998 | Ohayon | |
| 6,145,241 | A * | 11/2000 | Okuno | A01M 1/2077 239/145 |
| 6,244,474 | B1 | 6/2001 | Loeffler | |
| 6,413,238 | B1 * | 7/2002 | Maget | A61M 5/14526 604/67 |
| 2005/0185940 | A1 | 8/2005 | Joshi et al. | |
| 2006/0186140 | A1 | 8/2006 | Kanfer et al. | |
| 2007/0095941 | A1 | 5/2007 | Gorres | |
| 2008/0171164 | A1 | 7/2008 | Lee et al. | |
| 2008/0265067 | A1 | 10/2008 | Waterman et al. | |
| 2015/0048119 | A1 | 2/2015 | Boehm et al. | |
| 2021/0274766 | A1 | 9/2021 | Leushuis | |
| 2022/0217963 | A1 | 7/2022 | Perez et al. | |

FOREIGN PATENT DOCUMENTS

| | | | | |
|---|---|---|---|---|
| JP | H0576438 | U | 10/1993 | |
| KR | 1020190137819 | A | 12/2019 | |
| WO | 2006123327 | A2 | 11/2006 | |
| WO | WO-2019243734 | A1 * | 12/2019 | A01M 1/02 |

OTHER PUBLICATIONS

Examination Report issued in UK Application No. GB2014166.9, mailed Jul. 8, 2021, 3 pages.

International Search Report and Written Opinion issued in International Application No. PCT/GB2021/052255, mailed Nov. 30, 2021, 11 pages.

Office Action issued in Japanese Application No. 2023-514822, mailed Aug. 12, 2025, 14 pages.

* cited by examiner

SYSTEM FOR DISPENSING A PEST ATTRACTANT OR REPELLENT, CORRESPONDING REFILL AND METHOD

CROSS-REFERENCE TO RELATED APPLICATIONS

This application is the U.S. National Stage Application of International Application No. PCT/GB2021/052255, filed Sep. 1, 2021, which claims the benefit of GB Patent Application Serial No. 2014166.9, filed Sep. 9, 2020, which are hereby incorporated by reference in their entirety.

TECHNICAL FIELD

The present disclosure relates to systems, methods, and apparatuses for automatically replenishing a substance that is attractive or repulsive to pests.

BACKGROUND

Rodents, flies, cockroaches, and other nuisance insects and animals (hereafter referred to collectively as "pests") rely heavily on scent (specific chemicals in the air) to navigate, find food, mates, etc. These scents include pheromones, which are scents emitted by other pests of the same species (for example for mating) and kairomones, which are scents emitted by food sources. When used in a pest trap these scents are referred to as attractants and are widely used in both pest traps and pest detection devices (collectively referred to as 'traps') and may be either the natural scent or a synthesized scent designed to mimic the natural scent.

Solutions that offer longer service lives have significant advantages over systems with shorter lives because they reduce labour and consumable costs of the overall system. However, most attractants consist of highly volatile scent chemicals that are hard to maintain for long periods.

Service life is a combination of storage life and the duration of attractive effect, which we term "attractive life". Storage life refers to the amount of time it can be stored for without degrading (becoming significantly less attractive). Attractive life refers to the amount of time a system remains adequately attractive to the target pest.

Therefore there is a need for systems that can provide long term, stable storage and slow release of attractants.

Systems exist to provide a slow release of attractants in pest traps in an uncontrolled manner. Some of these solutions are: A wick sticking out of a bottle full of liquid attractant. A pot of attractant where the lid is peeled off and evaporation occurs. A plastic pod filled with attractant stored in a sachet, the sachet is opened and the attractant diffuses through the plastic. Some of these solutions solve the problem of long storage life but none are able to achieve long storage and attractive life. Specifically, these solutions all suffer from one or more of the following severe limitations:

The mechanism by which the attractant dispense rate is regulated is by diffusion or by evaporation. The rates of both these mechanisms are strongly correlated with temperature and therefore varying temperature introduces inconsistent performance. This is important because it limits the temperature range over which such a system is effective. Also, concentrations that are too high can result in the attractant becoming no longer attractive or even sometimes repulsive.

These attractants normally comprise of several chemical components all of which have different properties (such as evaporation rate). This means the most volatile chemicals evaporate first which means the ratios of the attractive chemicals vary over time. The relative evaporation rate of the chemicals can also vary with temperature. This is an issue because the ratios of the attractive chemicals is often critical to them remaining attractive. A variation in the ratios will make the scent no longer attractive or even repulsive.

Attractant chemicals often degrade slowly (over a few weeks) with oxygen or water vapour, this can be from oxygen or water diffusing through the storage material and they do not have to be exposed directly to the air. It is not possible to have a material that lets the attractants though but not oxygen or water vapour, therefore uncontrolled dispensing cannot solve this problem.

As a result of the problems detailed above, the attractants need regular servicing to renew or replenish the chemicals. A large cost associated with replacing or servicing and attractant dispensing systems is the labour. Pest monitoring often happens in locations which are not easily accessible. This means that any servicing or replacing of attractant dispensing systems is expensive. In the particular case of automated "Smart" monitoring systems (which do not require regular human inspection and may be designed to operate for extended periods between servicing) the requirement for long life attractant solutions is particularly strong.

One approach to resolve the challenges above is to control the release of fresh attractant. Mechanisms for dispensing attractants exist (controlled dispensing). One example is the use of high pressure canisters (i.e. aerosols) and a mechanism to release them, this is similar to automatic household air fresheners. These controlled systems are expensive to produce as both manufacturing and filling the canisters is expensive. The canisters are also large which limits the placement and portability of the device, for example they could not be placed under a bed.

Other problems with these existing systems is that the attractants dissipate rapidly in a number of seconds and the mechanisms require high activation force. This results in them using large amounts of power requiring large batteries or a mains electricity supply which is often not available. This exacerbates the issues with size, weight and cost that these existing approaches have. As a result of these problems, existing mechanisms for dispensing attractant only run for short periods of time and are not suitable for many applications.

In summary, no pest attractant dispense system can last for a long time and is cheap to produce. Both of these are important criteria for pest trapping and monitoring.

SUMMARY OF THE INVENTION

According to a first aspect of the invention, there is provided a system for dispensing a pest attractant or repellent into a surrounding environment, comprising: a main reservoir for storing a fluid; a control volume coupled to the main reservoir; a first flow restrictor arranged to regulate a flow of the fluid between the main reservoir and the control volume; a second flow restrictor arranged to regulate a flow of the fluid out of the control volume; and, an evaporation medium positioned at or downstream of the first flow restrictor, wherein at least one of the first and the second flow restrictors is a controllable flow restrictor, and wherein the system further comprises electronically controllable actuation means for actuating the controllable flow restrictor.

This system allows the rate at which the attractant or repellent is dispensed to be carefully controlled with very low power requirements. Using a control volume into which the attractant or repellent is transferred before being dispensed into the surrounding environment means that a known quantity of the attractant or repellent can dispensed at a known rate (which can be chosen, among other factors, based on observed values of variables such as temperature and/or humidity).

In addition, the attractant or repellent is only exposed to the environment after it has been transferred into the control volume, i.e. the main reservoir itself is never directly exposed to the surrounding environment. This is particularly important if the attractant or repellent uses several chemical compounds that evaporate at different rates, as it ensures that the fluid in the main reservoir is stored without evaporation occurring and all chemical compounds are dispensed at the correct rate, therefore prolonging the useful life of the attractant or repellent compared to existing systems that rely on evaporation alone without a control volume and multiple flow restrictors.

In addition, keeping the fluid in the main reservoir isolated from the surrounding environment ensures that the attractant or repellent is not degraded by oxygen or water vapour in the air. The control volume essentially acts as an air lock between the main reservoir and the surrounding environment.

Furthermore, having a control volume means that the controllable flow restrictor can be actuated with minimal energy, unlike existing aerosol style dispensers that require a significant amount of energy to open a seal on an aerosol cylinder or similar for a predetermined duration. The system can also be much smaller than aerosol-based systems and is cheaper to produce.

The combination of low power and long-lasting attractant or repellent means that the system of the present invention has a long lifetime, which in turn reduces costs involved in servicing the system (as the attractant or repellent does not need to be replaced as regularly). In addition, the system of the present invention is small and cheap to manufacture.

The pest attractant or repellent may be stored in liquid form in the main reservoir and may evaporate when it is released from the control volume into the surrounding environment, preferably via an evaporation medium such as a wick.

The insect attractant or repellent flows onto the evaporation medium during use.

The evaporation medium may have at least one evaporative surface from which the pest attractant or repellent evaporates. The at least one evaporative surface is preferably downstream of the first flow restrictor.

The control volume may optionally be defined by a volume formed between the first and the second flow restrictors. For example, the volume may be formed in a fluid conduit between the first and second flow restrictors.

The controllable flow restrictor is preferably controllable between an open first position and a second position in which a flow of the fluid is restricted. In the open first position the fluid can flow freely, whereas in the second position the flow of fluid is restricted to a rate that is much lower than in the open first position (e.g. a negligible rate). Optionally, the restricted position may be a closed position in which no fluid can flow through the controllable flow restrictor.

In some examples, both the first and the second flow restrictors may be independently controllable flow restrictors.

The flow restrictors can be any devices capable of restricting (i.e. limiting) a flow of fluid (preferably a liquid) through a conduit (e.g. a tube or pipe or similar). The controllable flow restrictor may be a valve or any other device capable of controllably adjusting a flow of a fluid.

For example, the controllable flow restrictor may be adapted to restrict the flow of fluid by compressing a flexible conduit containing the fluid. The flexible conduit may be coupled to the main reservoir, for example via the first flow restrictor. Such an arrangement is relatively cheap to manufacture and requires very little energy to open or close the flow restrictor.

The controllable flow restrictor may comprise a resilient member (such as a spring) biased to compress the flexible conduit, i.e. restriction of the flow may be the default configuration and energy may be input to the system to actuate and open the controllable flow adjuster.

Optionally, the second flow restrictor may comprise the evaporation medium and the evaporation medium may be coupled to the surrounding environment. For example, the evaporation medium may be a wick. The evaporation medium may regulate the flow of the fluid out of the control volume by means of evaporation. In other words, the flow rate may be regulated by the evaporation rate.

As mentioned earlier, the fluid may preferably be a liquid, and the liquid may evaporate from the evaporation medium into the surrounding environment when in use.

The evaporation medium itself may define the control volume. For example, the control volume may be the volume of fluid that corresponds to the volume of fluid retained by the evaporation medium when the evaporation medium is saturated.

Alternatively, the first flow restrictor may comprise the evaporation medium and the evaporation medium may be coupled to an evaporation chamber, wherein the control volume is defined by the evaporation chamber, and wherein, in use, the fluid evaporates into the evaporation chamber. That is, the control volume is the combination of the saturated evaporation chamber and the saturated evaporation medium.

In this alternative, the second flow restrictor may be the controllable flow restrictor, and regulating the flow of the fluid out of the control volume may comprise releasing evaporated fluid from the evaporation chamber into the surrounding environment.

Optionally, the second flow restrictor may comprise the control volume. For example, when the flow restrictor comprises an evaporation medium, the evaporation medium may define the control volume.

Preferably, the main reservoir and the control volume are formed from a single flexible pouch. This allows the fluid in the system to be easily and cheaply replaced once depleted by replacing the pouch, and means that the other components (such as relatively expensive actuators) do not need to be replaced each time the fluid is depleted.

The pouch may also comprise an integrated evaporation medium such as a wick.

Alternatively, the system may instead comprise a dispensing tube connected to the main reservoir. This dispensing tube may comprise the control volume.

In some examples, the main reservoir may be pressurised. For example, the reservoir may be pressurised by gravity, a compressive force from a resilient member, or by a pressurised gas or propellant.

The control volume may be coupled to the surrounding environment. The second flow restrictor may be adapted to regulate the flow of the fluid out of the control volume and into the surrounding environment.

In some embodiments, the control volume may be a fixed volume. For example, the control volume may be chosen to be a single dose of the attractant or repellent.

Alternatively, the control volume may be an adjustable volume (for example, it may be adjusted to account for changes in environmental factors such as temperature). The control volume could be adjustable by adjusting a position of the first and/or the second flow restrictor.

In addition, the system may further comprise means for electronically monitoring a volume of the fluid that is dispensed into the control volume, whereby the controllable flow restrictor is controllable based upon the monitored volume.

The first and the second flow restrictors of the system are preferably connected in series with one another. In other words, the first flow restrictor is coupled to the main reservoir, and the second flow restrictor is coupled to the main reservoir via the first flow restrictor.

The system may further comprise one or more additional reservoirs comprising one or more respective additional fluids. The one or more additional reservoirs may be coupled to the system between the first and the second flow restrictors, or they may be coupled to the system after the second flow restrictor (that is, not between the first and second flow restrictors). Each additional reservoir may optionally be coupled to the system via one or more additional flow restrictors.

According to another aspect of the invention, there is provided a pest attractant or repellent refill for use in the system of the first aspect, wherein the refill comprises the main reservoir. Such a refill allows the pest attractant or repellent to be replaced easily and at low cost. The refill need only contain relatively cheap parts such as springs, the attractant or repellent, and plastic parts, and it does not need to contain any expensive parts such as motors or actuators, thereby helping to reduce costs. All expensive parts are provided elsewhere in the system.

Preferably, the refill comprises the first flow restrictor, wherein the first flow restrictor is adapted to interface with an actuator of the first aspect.

Optionally, the first flow restrictor may comprise a resilient member configured to bias the first flow restrictor to a closed position.

The refill may comprise a pouch, wherein the pouch comprises a tearable section that is removable to expose an evaporation medium within the pouch.

According to a further aspect of the invention, there is provided a method of dispensing a pest attractant or repellent fluid into a surrounding environment, comprising: regulating, using a first flow restrictor, a flow of the fluid from a main reservoir containing the fluid to a control volume coupled to the main reservoir; and, regulating, using a second flow restrictor, a flow of the fluid from the control volume to the surrounding environment, wherein at least one of the first flow restrictor and the second flow restrictor is a controllable flow restrictor; wherein regulating at least one of the flow of the fluid from the main reservoir to the control volume and the flow of the fluid from the control volume to the surrounding environment comprises opening, by electronically controllable actuation means, the controllable flow restrictor; and, wherein an evaporation medium is positioned at or downstream of the first flow restrictor.

This method shares the benefits described above in relation to the first aspect.

Preferably, the method further comprises reading input data such as time, temperature, and/or humidity.

The method may further comprise determining that fluid needs to be dispensed based on the input data.

The method may further comprise closing the controllable flow restrictor after a predetermined duration. Closing the flow restrictor means to stop or significantly reduce the flow of the fluid.

The controllable flow restrictor may be closed when a specified electrical input is detected, which may be after a predetermined duration.

Regulating the flow of the fluid from the control volume to the surrounding environment may comprise evaporating the fluid.

According to an alternative aspect, there is provided a system for dispensing a pest attractant or repellent into a surrounding environment, comprising: a main reservoir for storing a fluid; a controllable flow restrictor arranged to regulate a flow of the fluid out of the main reservoir; and, a fluid volume sensor adapted to measure a volume of fluid dispensed by the controllable flow restrictor (when the system is in use).

The controllable flow restrictor may be controllable between an open first position and a second position in which a flow of the fluid is restricted. The second position may be a closed position in which no fluid can flow.

Preferably, the system further comprises a control element configured to actuate the controllable flow restrictor between the first and the second positions.

Preferably, in use, the control element is configured to actuate the flow restrictor to the second position when the fluid volume sensor indicates that a predetermined volume of the fluid has been dispensed.

The system may further comprise an evaporation medium, such as a wick, coupled to the surrounding environment, preferably wherein the fluid is a liquid and whereby, in use, the liquid evaporates from the evaporation medium into the surrounding environment.

The controllable flow restrictor may be configured in the same manner as the first aspect of the invention. For example, it may be a valve or other type of controllable flow restrictor, and it may be arranged to restrict the flow of the fluid by compressing a flexible conduit containing the fluid. It may additionally comprise a resilient member biased to compress the flexible conduit.

The fluid may be dispensed into an evaporation medium such as a wick, and the fluid volume sensor may comprise a pair of electrodes configured to measure an electrical impedance in the evaporation medium to thereby determine a moisture level of the evaporation medium (a hence a volume of fluid that has been dispensed).

Alternatively, the fluid volume sensor may use an optical sensor to detect a volume of fluid, or other means, such as a mass of the evaporation medium, to determine the volume of the fluid.

According to yet another alternative aspect, there is provided a method for dispensing a pest attractant or repellent fluid into a surrounding environment, comprising: opening a flow restrictor coupled to a main reservoir containing the fluid; using a fluid volume sensor to measure a volume of fluid dispensed by the flow restrictor; and, closing the flow restrictor when a predetermined volume of the fluid (as detected by the fluid volume sensor) has been dispensed.

Closing the flow restrictor means to stop or significantly reduce the flow of the fluid.

BRIEF DESCRIPTION OF THE DRAWINGS

Examples of the present invention will now be described in detail with reference to the accompanying drawings, in which.

DETAILED DESCRIPTION

The present disclosure provides systems and methods to dispense a substance in a controlled manner that is attractive or repulsive to pests. In the ensuring description, any reference to an attractant should be understood to mean an attractant or a repellent. In one embodiment, the system dispenses an attractant into the air by allowing a controlled amount of the attractant to evaporate off a medium. The system releases a controlled amount of high concentration attractant liquid from its reservoir compartment into a second compartment. From this second compartment, the attractant liquid can slowly travel out onto a surface which it evaporates off.

The system substantially solves the problems described above by significantly increasing the amount of time a trap or monitoring system can remain effective without servicing. This is because the attractant in the device can be stored for a long amount of time without degrading or getting out. The attractant can be released when required and in a controlled manner. The system also does this at a low cost with a form factor practical for a wide variety of applications.

Embodiments will now be described by way of example only.

Figure 1A:
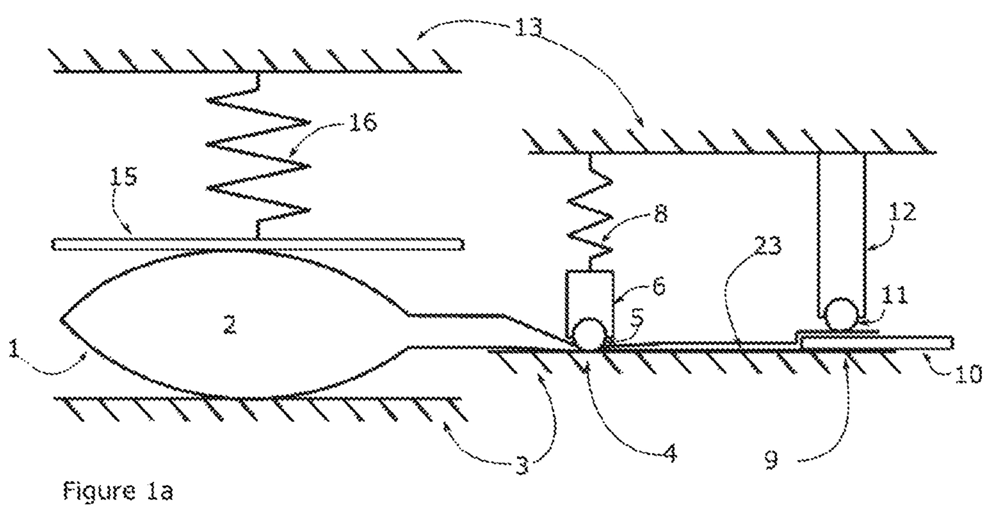
FIGS. 1*a*-1*c* show cross-sections of an embodiment of the dispenser mechanism.

Referring to FIG. 1*a*, a cross-sectional view of one embodiment of the dispensing system for long term operation is shown in a state of not dispensing attractant. There is a liquid-proof pouch 1 containing the liquid attractant in the reservoir part 2, which is made out of a flexible material. The pouch rests on a substantially rigid floor 3.

The attractant is stored in the reservoir part of the pouch 2, the attractant is held there by the first seal or flow restrictor at point 4. This first seal is a way of temporally sealing the pouch, this allows for attractant to be dispensed out of the reservoir compartment 2 by opening this first seal. In this embodiment, the seal works by clamping the pouch between the floor 3 and a compliment material 5 such as a nitrile rubber cord but it will be apparent that any similar method of preventing the liquid from escaping the pouch could also be used, such as kinking, twisting or otherwise pinching the pouch. The compliant material 5 is held in place by a rigid component 6 that is free to move in the vertical direction. This component 6 is held by the rigid housing 7 such that it can only move substantially perpendicular to the floor 3. The component 6 is held against the pouch clamping the pouch seal shut using a spring 8. This spring means that if there is no physical input to lift the lever 6 the pouch is sealed, which allows it to remain sealed indefinitely whilst consuming no power. There is a second seal or flow restrictor at point 9. This second seal seals the pouch material around a "wick" material 10. The compliant component surface 11 is held down by a rigid component 12, which is securely attached to the housing roof 13. The second seal is not a complete seal, it substantially restricts the flow through it resulting in the flow through the first seal when open being greater than that of the second seal. The second seal is always shut. The liquid inside the reservoir 2 is pressurized by a pressure plate 15 and a second spring 16 pushing the pressure plate down. The present invention encompasses any method of pressurising the liquid in the pouch and alternative embodiments include the use of gravity to pressurise the liquid, rolling the pouch using a spring, pressurizing the volume around the pouch and using a plunger mechanism such as a syringe as the pouch pressurised by a spring. In the embodiment shown both the pouch spring 16 and the valve spring 8 are pre-loaded compression springs, exerting an expansion force between the housing roof 13 and the plate 15 and the component 6 respectively. The pouch reservoir part 1 and the pouch channel part channel 22 are supported by the housing floor 3.

This embodiment shows housing components 3, 6, 12, 13 as substantially parallel. It will be recognised that the present invention does not require that the components be parallel or even adjacent. The reservoir subsystem, consisting of the pouch 1, plate 15, spring 16 and floor 3 may be located in any location or orientation relative to the release sub-system consisting of the control volume channel 23, the first seal at point 4 and the second seal at point 9 and associated springs and mechanisms. It is also recognised that the "wick" 10 is not required for operation and it could work without. Different embodiments of the "wick" are possible, for example, it could be not within the pouch but located such that liquid is dispensed onto it.

Figure 1B:
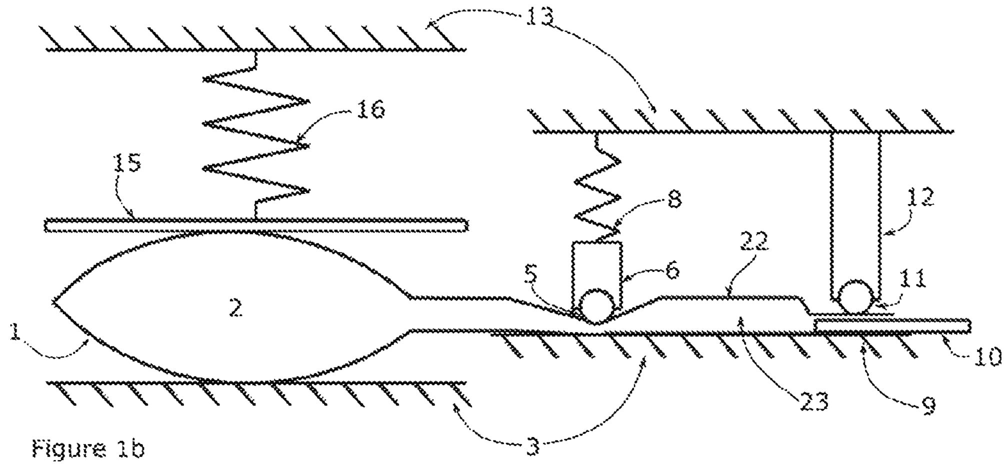

In FIG. 1*b* the seal has been opened, which allows the elevated pressure in the pouch to force liquid into the channel 23, causing it to fill up. The spring 16 is selected so that it exerts sufficient pressure to fully inflate the channel 23. This results in a substantially constant amount of liquid being contained within the channel after the valve is opened. An alternative embodiment could see the channel not fully inflating. The volume of this liquid when the channel 23 is fully expanded is referred to below as the control volume. In this embodiment, the control volume cannot be varied. The high flow resistance of the wick 10 and the second seal at point 9 prevents any substantial amount of the liquid from escaping the channel while the first seal is open. This wick clamped between the pouch material prevents liquid from passing through rapidly but will very slowly draw the liquid through over time. Alternatively, this component 12 could be part of the housing roof 13. The first seal is shut once sufficient time has elapsed to inflate the channel but before a substantial amount of liquid has passed the second seal point 9.

Figure 1C:
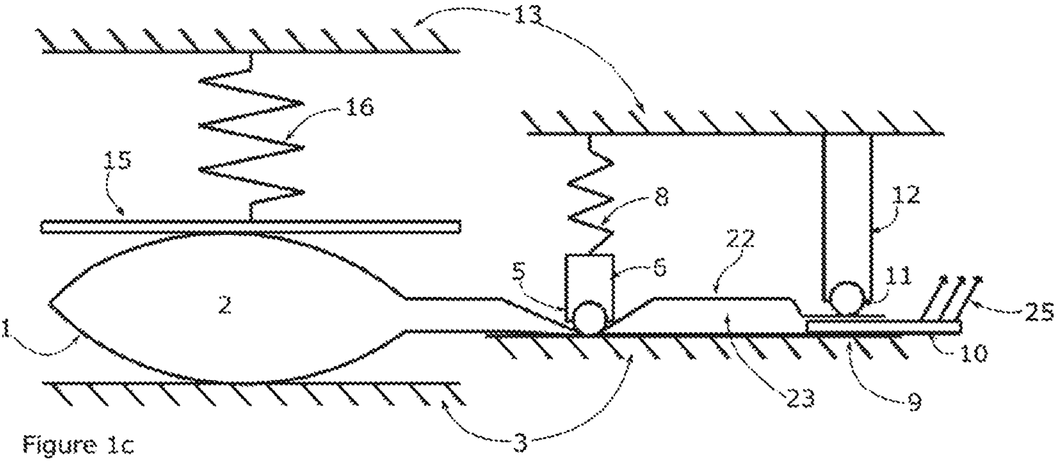

FIG. 1*c* shows the embodiment after the first seal 4 is reclosed, leaving the control volume of fluid in the channel 23. When the first seal is shut this encloses a substantially constant volume of liquid. In this state of the system, the liquid within the channel 23 is able to slowly absorb into the wick 10 and evaporates 25.

Figures 6A, 6B:
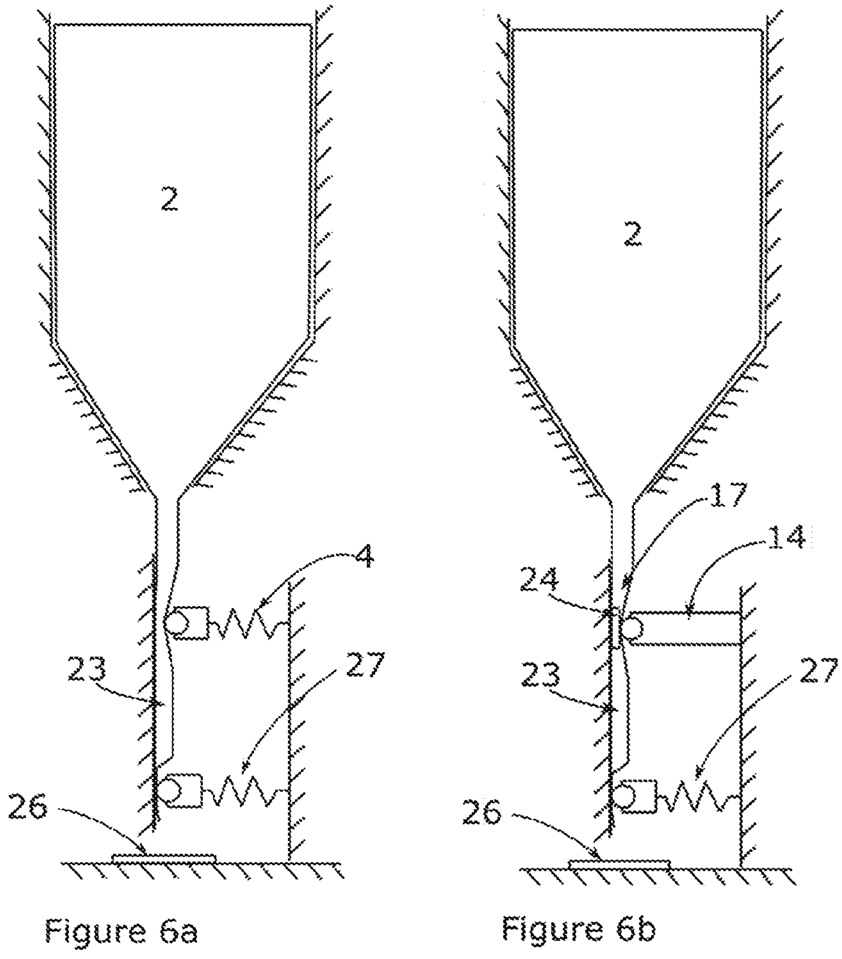
FIGS. 6*a* and 6*b* show alternative embodiments in which an evaporation medium (such as a wick) is not connected to a channel.

It is recognized that without the wick in the channel and the channel in a horizontal plain liquid may not come out of the channel as reliably. An embodiment that avoids this a spring is used to apply slight pressure to the channel. Alternatives that would achieve the same effect are a roller moving across the channel would perform similarly, alternatively having the channel in a vertical orientation as shown in FIGS. 6*a* and 6*b* could perform similarly. If an above mechanism is used it is not required for the wick to be integrated in the channel.

It will be understood that the control volume can be changed in size to suit particular applications, this means the volume of liquid dispensed per actuation can be easily changed. The volume, surface area, material and porosity of exposed wick can also be altered to suit particular applications which allows the evaporation rate to be easily altered. Note that the evaporation rate can be designed to be limiting here and the wick can remain saturated between dispenses to maintain a constant dispense rate if the environmental conditions are maintained. Alternatively, the dispense volume can be less than the amount the wick can hold giving much finer control of dispense rate however it may consume marginally more power.

Figures 4A, 4B:
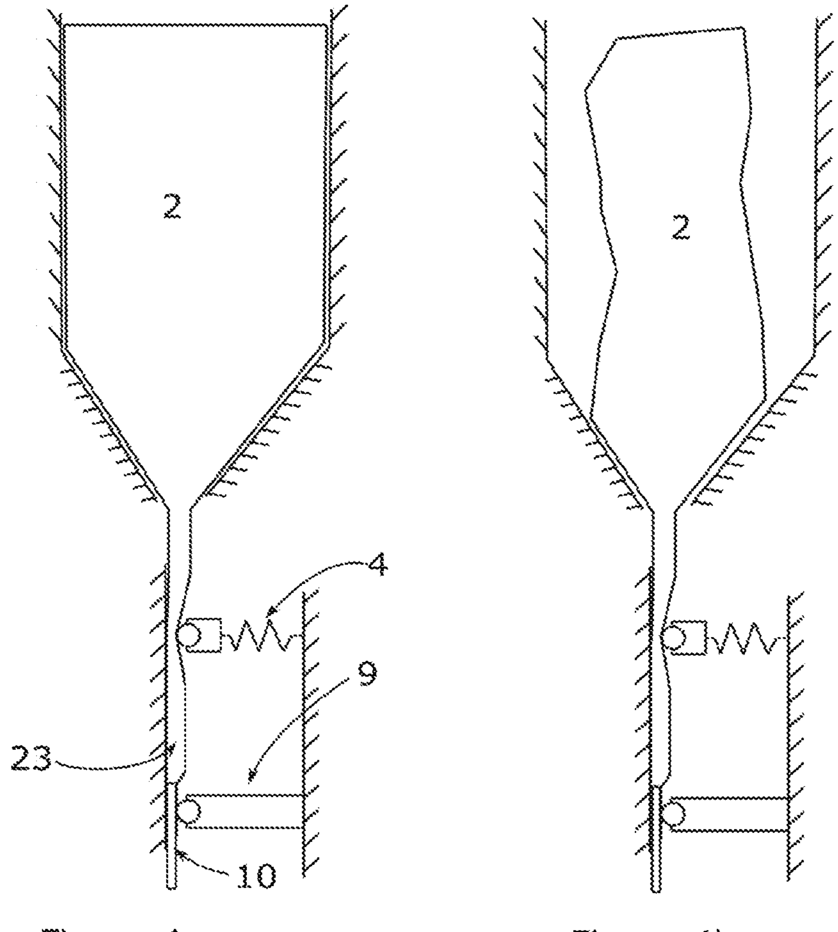
FIGS. 4*a* and 4*b* show an alternative embodiment which uses gravity to pressurise liquid instead of a spring.

FIGS. 4*a* and 4*b* show an alternative embodiment that uses gravity to pressurise the liquid at the first valve. When the first valve 4 is opened this pressure forces it through into the channel 23. FIG. 4*a* shows a system full of liquid, FIG. 4*b* shows the embodiment of FIG. 4*a* once approximately half of the fluid has been dispensed. The valve 4, flow restrictor 9, channel 23 and wick 10 can be the same as detailed in FIGS. 1*a*-1*c* but in a different orientation. The volume of liquid dispensed is able to stay substantially constant, despite any variation in pressure at the first valve because the volume of the channel 23 remains constant.

FIG. 6*a* shows an alternative embodiment where a controlled second seal 27 is used and the wick 26 is external to the channel. This second seal 27 would be shut when the first seal 4 is opened then opened when the first seal is shut. In certain applications this increases dispense consistency. In another alternative embodiment, one or both of the seal components are able to move along the direction of the channel, thereby changing the control volume and the amount of attractant dispensed each time the first seal is opened.

FIG. 6*b* shows another alternative embodiment where a flow restrictor 24,14 is used between the reservoir 2 and the channel 23. The flow restriction is such that the channel 23 is able to fill slowly from the reservoir 2 when the second valve 27 is closed. When the second valve 27 is opened the channel would empty before a significant amount of liquid passed through the flow restrictor 24. The second valve would then be shut allowing the channel 23 to refill. This is achieved by the flow resistance of the flow restrictor 24 being substantially higher than the flow restriction of the open state of the second valve 27.

An alternative embodiment of this design uses two storage pouches but combines the two liquids at some point before the attractant leaves the device. For example a system could have two pouches that are combined in a common channel.

A preferred embodiment of the pouch 1 is made out of a flexible vapour barrier, such as a metallized polymer film which is flexible and stops the ingress of oxygen or water vapour and also prevents the diffusion and evaporation of liquid out of the pouch through the walls. The material is permanently sealed around the edges, such as by heat sealing to bond two layers of the film together, as is common for storage of perishable products. The wick 10 is placed within the pouch before the permanent sealing in order to fix it in place and avoid gaps around the outside of the wick. Alternatively, it could be placed in after the permanent sealing to make manufacturing easier. In this alternative embodiment, the second seal at point 9 is used exclusively to prevent liquid escaping, which requires immediate assembly into the housing after or even before filling the pouch with liquid.

An alternative embodiment of this pouch 1 and channel 23 is where they are separate parts connected together by a tube this is shown in FIGS. 5*a*-5*b* and 7*a*-7*c*.

Figure 5B:
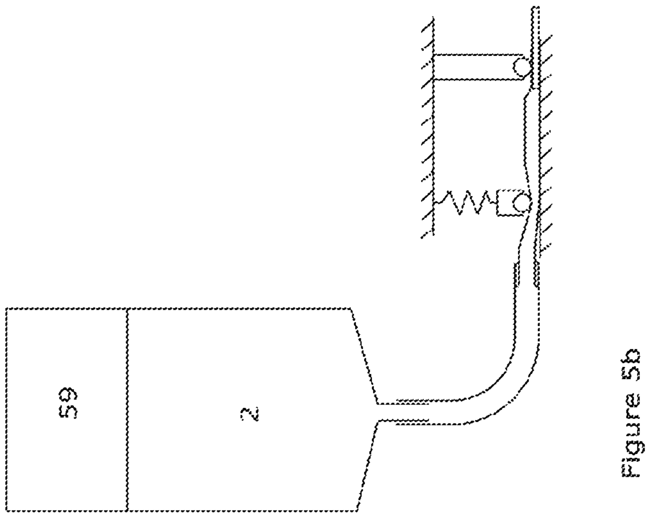
FIGS. 5*a* and 5*b* show alternative embodiments which use a rigid reservoir compartment housing.
Figure 5A:
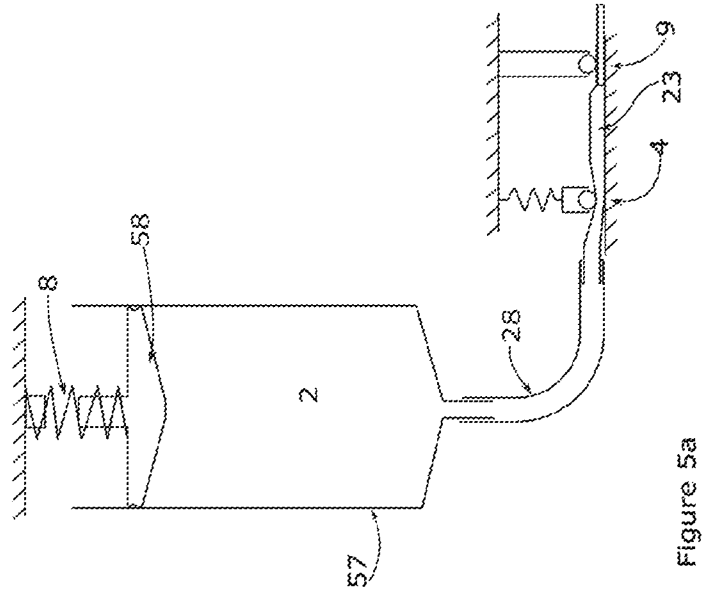

FIG. 5*a* shows an alternative embodiment where the reservoir part 2 holding the liquid is a rigid part 57 and the liquid inside is pressurized by a plunger 58. FIG. 5*b* shows a similar system however the pressurization of the liquid is done by pressurized gas 59. There are other possible similar embodiments such as separating the gas and liquid with a plunger or alternatively pressurizing the exterior surface of a flexible pouch with gas within an enclosed chamber. FIGS. 5*a* and 5*b* shows the reservoir 2 being attached to the dispensing channel 23 with a tube 28.

In an alternative embodiment the dispensing channel could be a rigid tube or chamber between the first and second valves or restrictors. In this embodiment the channel fills with air as the liquid leaves the channel evaporating off the wick. When filling the channel (when the first valve is opened) the air would be pushed out of the channel, flow restrictor could be designed such that it has lower resistance to gasses than liquids thus pushing the air out quickly as the channel fills.

Figure 7A:
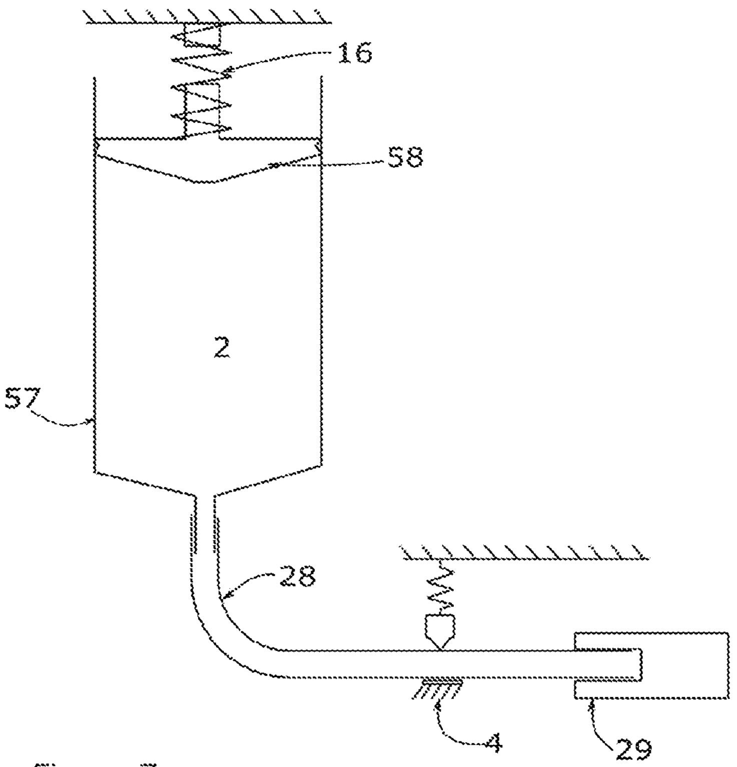
FIGS. 7*a*-7*c* show alternative embodiments where the evaporation medium is mounted on the outside of the channel.
Figure 7B:
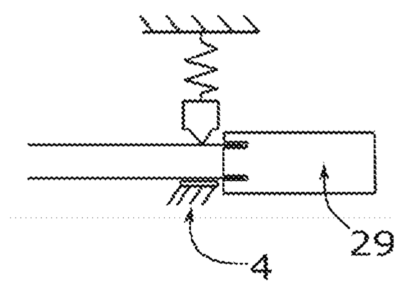
Figure 7C:
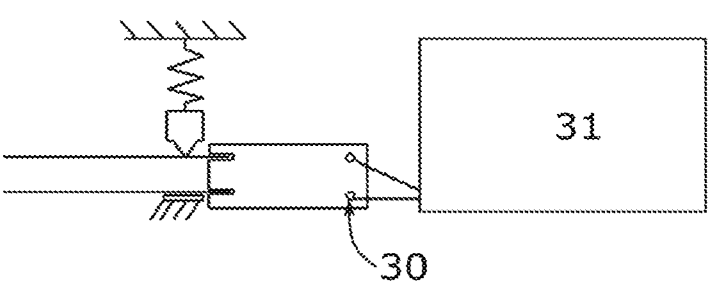

FIGS. 7*a*-7*c* show alternative embodiments of the first valve, flow restrictor and channel. All three figures show a flexible tube 28 that is pinched or kinked to prevent flow by the first valve mechanism 4.

FIG. 7*a* shows the wick 29 attached to the tube. In this embodiment the wick is selected so that it provides significant resistance to flow (e.g. a porous material with a small pore size). In this embodiment the wick combines the function of wick 10 and flow restrictor 9 shown in previous figures.

FIG. 7*b* shows an embodiment of the dispensing part which does not have a channel 23 or separate flow restrictor 9 such as in other embodiments. The wick 29 is designed such that the volume of liquid that can be held in the wick, when saturated, is the desired dispensing volume. This can be achieved by using the effect of surface tension to prevent the further flow into the wick once it becomes saturated. Alternatively, the amount of time the valve 4 is open for can be used to control the volume. Note valve 4 could be mounted such that it pinches the wick as well as the tube. The wick again combines the functions of the wick 10 and flow restrictor 9 shown in previous figures.

FIG. 7*c* shows a similar embodiment to FIG. 7*b* but with the addition of sensing electronics to sense how much liquid has been absorbed by the wick. In this embodiment electrodes within the wick are used to measure electrical impedance and hence detect the level of moisture in the wick. Many other sensing techniques could be used such as optical properties or weight of the wick. The sensors 30 are connected to a control system 31. In this embodiment this data is used to control the valves, replacing the delay 52 shown in FIG. 9 (described later).

Figure 8:
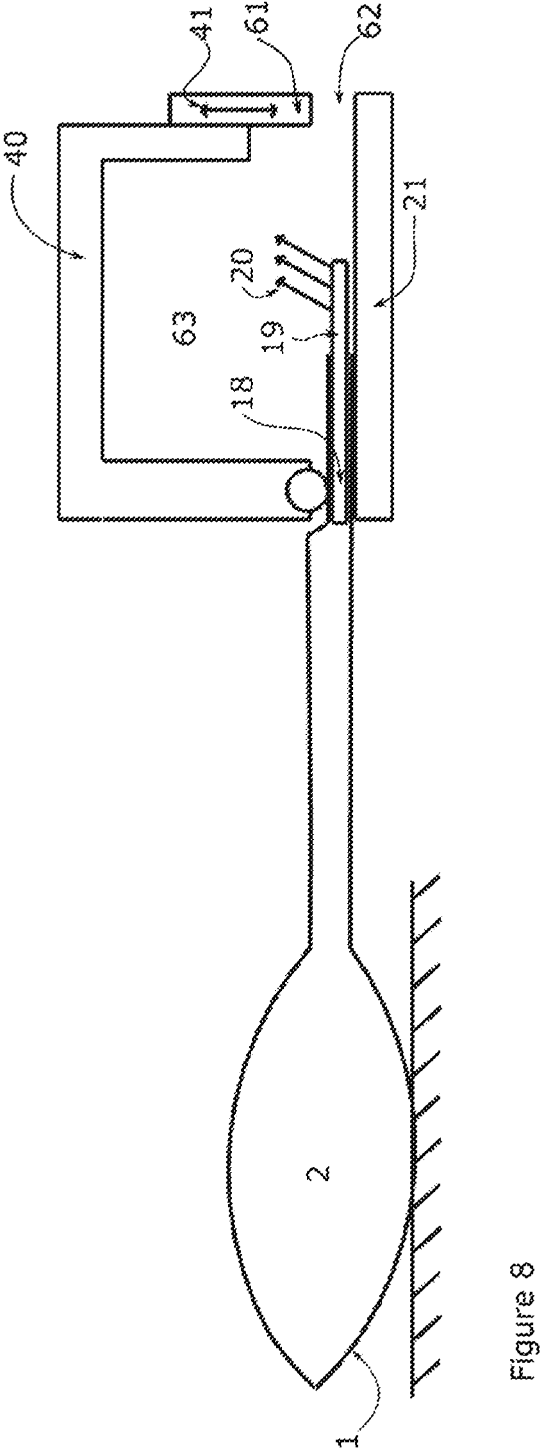
FIG. 8 shows an alternative embodiment in which attractant evaporates into a chamber that has an opening controlled by an actuator.

FIG. 8 shows an alternative embodiment of the invention showing no valve before the wick 19. Liquid 2 is stored in pouch 1, liquid is in contact with the wick 19 which results in the wick being permanently saturated. The wick is held in place in the pouch by the pressure applied at location 18 to the outside of the pouch. Attractant evaporates 20 off the wick 19 into the control volume 63. Attractant is released out of the opening 62. The opening 62 can be varied in size by moving slider 61 in direction 41. This movement can either be controlled actively by an actuator and control system or alternatively could be set manually by a person. Alternatively the control volume 63 could be very small with respect to the wick area. This means moving slider 41 can alter the exposed wick area and thus influence evaporation rate that way. In this embodiment, the wick 19 acts as one flow restrictor and the slider 61 acts as another.

Figure 2A:
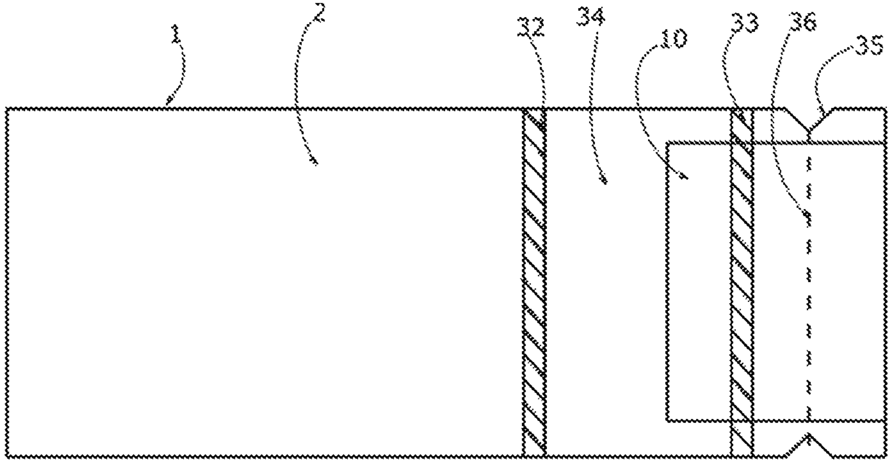
FIGS. 2*a* and 2*b* show a pouch to store and dispense attractant.
Figure 2B:
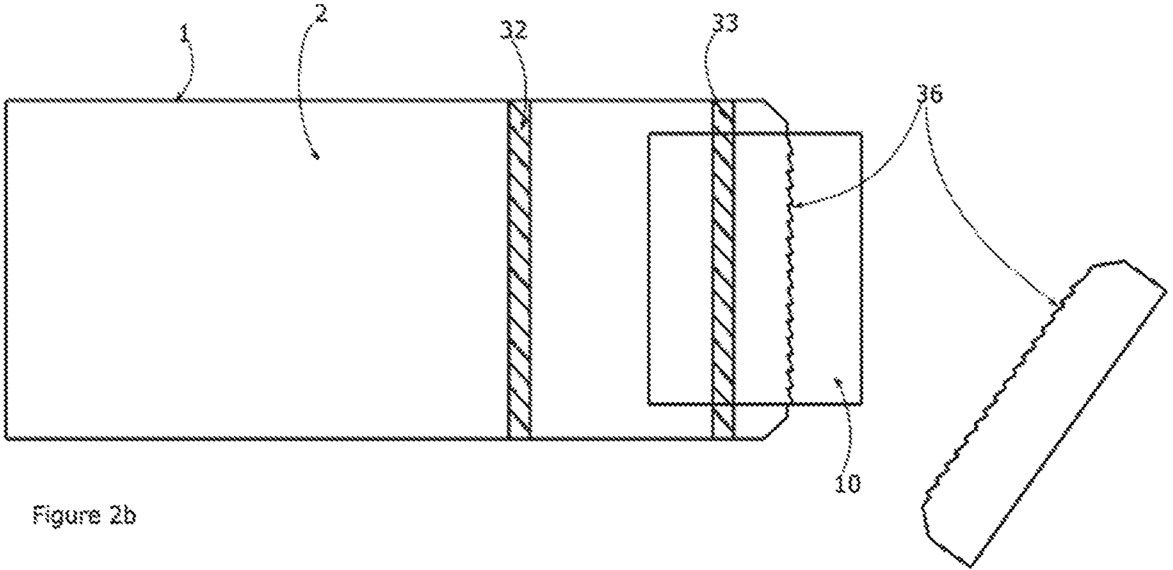

FIGS. 2*a* and 2*b* shows a preferred embodiment for the pouch where the wick 10 is fully sealed within the pouch material 1, the pouches can be filled and stored before later being assembled into the housings, as shown in FIGS. 1*a*-1*c*. Hatched areas 32 and 33 indicate the locations on the pouch where the first and second seals 4 and 9 apply pressure to the pouch respectively. 2 is the location of the reservoir and 34 is the location of the channel. There are notches 35 to allow for the pouch to be torn along a tear line 36. An alternative embodiment could see this cut away or manufactured such that it is only filed once the first seal is in place. Tearing the end tab 37 off exposes the wick 10 and allows for the attractant to evaporate after it is dispensed.

Figure 3A:
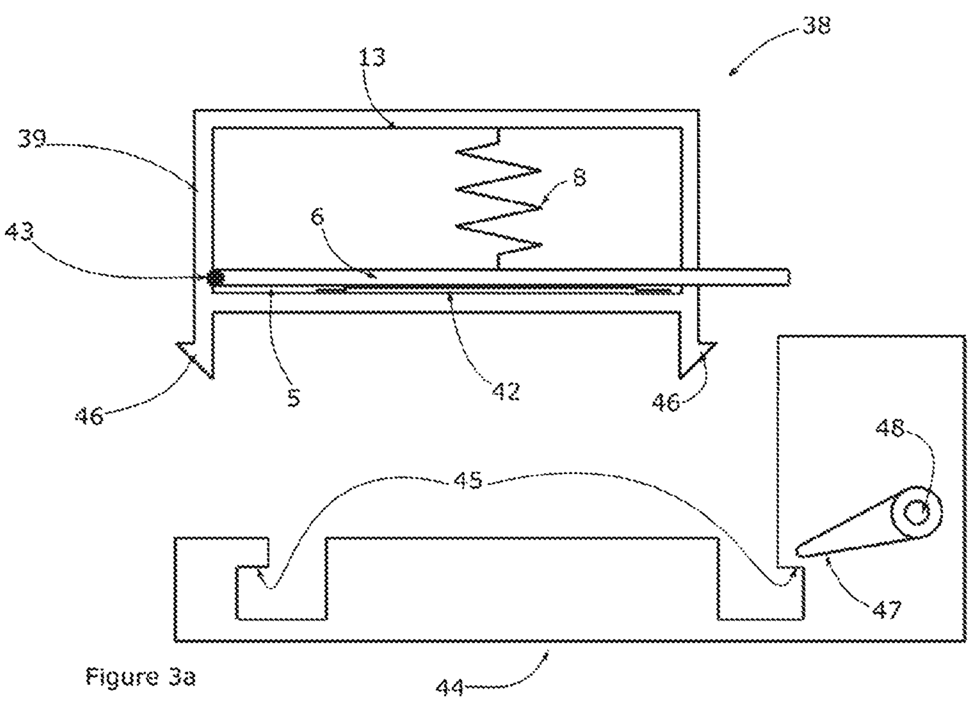
FIGS. 3*a*-3*c* show a replaceable cartridge and how it attaches and interacts with a non-disposable part of the system containing an actuator.
Figure 3B:
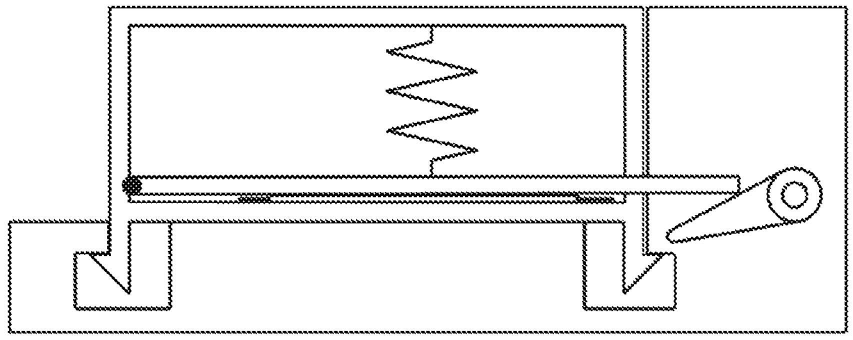
Figure 3C:
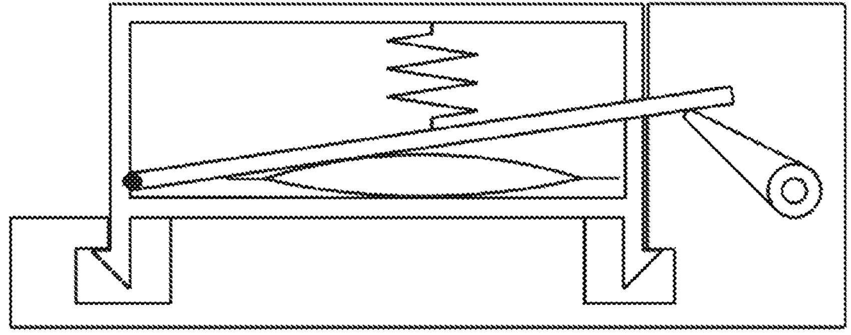

FIGS. 3*a*-3*c* show a cross-sections of an embodiment for opening and closing the first seal 4 using an electromechanical actuator (not shown) to allow liquid to enter the channel 23. In some embodiments the liquid reservoir component is replaceable to allow empty pouches to be removed and fresh, full pouches to be fitted. It is advantageous for the system if the actuator mechanism, which may be an expensive component, is not part of a consumable element of the system. To achieve this, a replaceable cartridge 38 containing a number of parts of the mechanism shown in FIGS. 1*a*-1*c*, which then connects to a permanent element of the system 44. An embodiment such as this has advantages because the replaceable cartridge 38 is Inexpensive to manufacture as it contains only springs 8, 16, plastic parts, and the pouch. This results in a significantly lower cost over the lifetime compared to other commercially available methods.

FIG. 3*a* shows a removable element 38 which has housing 39. The first valve spring 8 which holds shut the first valve and is held down by the roof 13 which is part of the housing element 39. The first valve consists of a rigid lever component 6 which holds a compliant material 5. The channel 42 is pressed shut between the compliant material 5 and the floor 3, the floor is part of the housing 39. The rigid component 6 is held in place by a pivot 43 at one end. The removable housing element also contains hooks 46 used to locate and attach it to the permanent element. The permanent element 44 has; slots 45 to hold and locate the hooks 46, a cam 47 that pivots on an axis 48 and an actuator to drive the cam. FIG. 3*a* shows the two system elements cartridge and main housing separated, prior to fitting. The valve spring 8 presses the valve shut when the two parts are separate, this means the attractant cartridge can be shipped and stored passively without dispensing any attractant. This also means no power is required to keep the dispensing system sealed.

FIG. 3*b* shows the cartridge 38 and main housing 44 clipped together but with the first seal shut. Clips 46 mate with mounting features 45 to hold the cartridge securely in place and align the rigid lever 6 to the cam 47. This is the state the system is in immediately after the cartridge is clipped in, this is also the state in which the system is in between dispensing events. The first seal 4 remains closed, as shown in FIGS. 1*a* and 1*c*.

FIG. 3*c* shows the mechanism achieving the state shown in FIG. 1*b*. This is achieved by activating the motor, which causes the cam 47 to rotate. This, in turn, pushes the rigid valve lever 6 up and opens the first seal. The liquid is able to enter the channel 23. The position of the cam may be controlled by position feedback, such as by an encoder or microswitches, or could alternately run against mechanical end-stops to limit the rotation. In other embodiments, the motor may be driven open-loop control or with simple timing control.

An alternative embodiment of this design does not have the removable cartridge 38 and permanent 44 components separable and it is all a single unit replaced or refilled when it runs out of either attractant or power.

Figure 9:
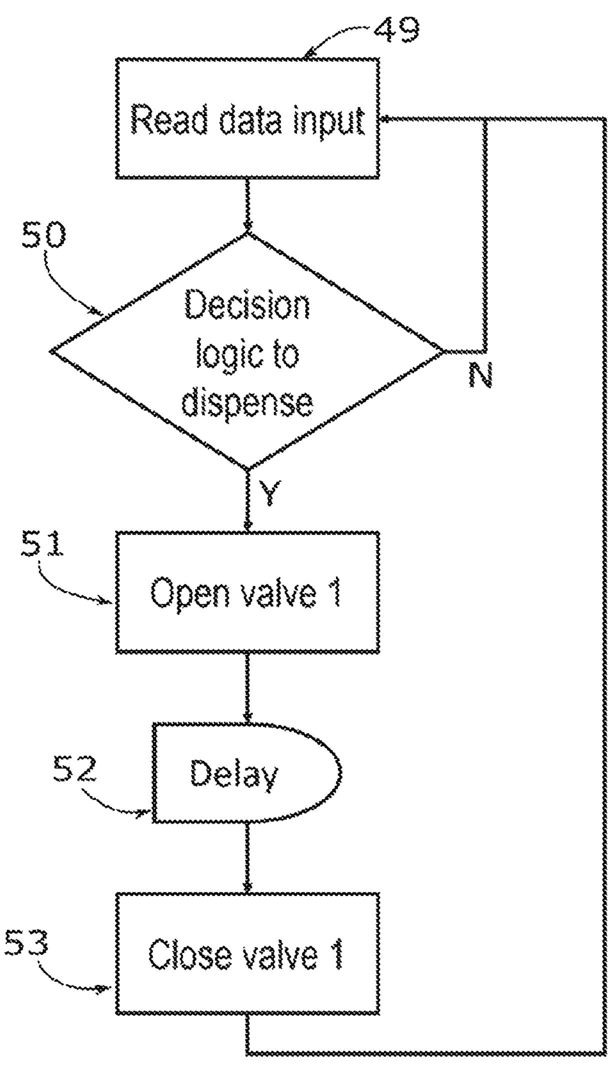
FIG. 9 shows a flowchart of a method for operating a control mechanism of the system; and, FIG. 10 shows a circuit block diagram for driving an actuator for the system.

FIG. 9 shows an embodiment for the control system logic that runs on the control system 31. Data such as time, humidity, temperature is input to the system 49. A logic element 50 receives the data and uses it to make a decision about whether to dispense any liquid. If the decision is not to dispense the program goes back to the read data state 49, if the decision is to dispense the control system performs an operation 51 to open the first seal 4. Opening the first seal allows liquid to enter the channel 23 starting the dispense process as defined above. For the embodiments shown in FIGS. 1*a*-1*c* and 3*a*-3*c* where the second seal is passive, there may be a delay 52 to allow for liquid in the channel 23 to reach the control volume but not too long to allow a significant amount of liquid to travel past the second seal 9. After the delay, the first seal 4 is closed 53 and the program returns to the start 49. An alternative embodiment could see no data inputs and the control system opens and closes the first seal periodically at a predefined rate.

Figure 10:
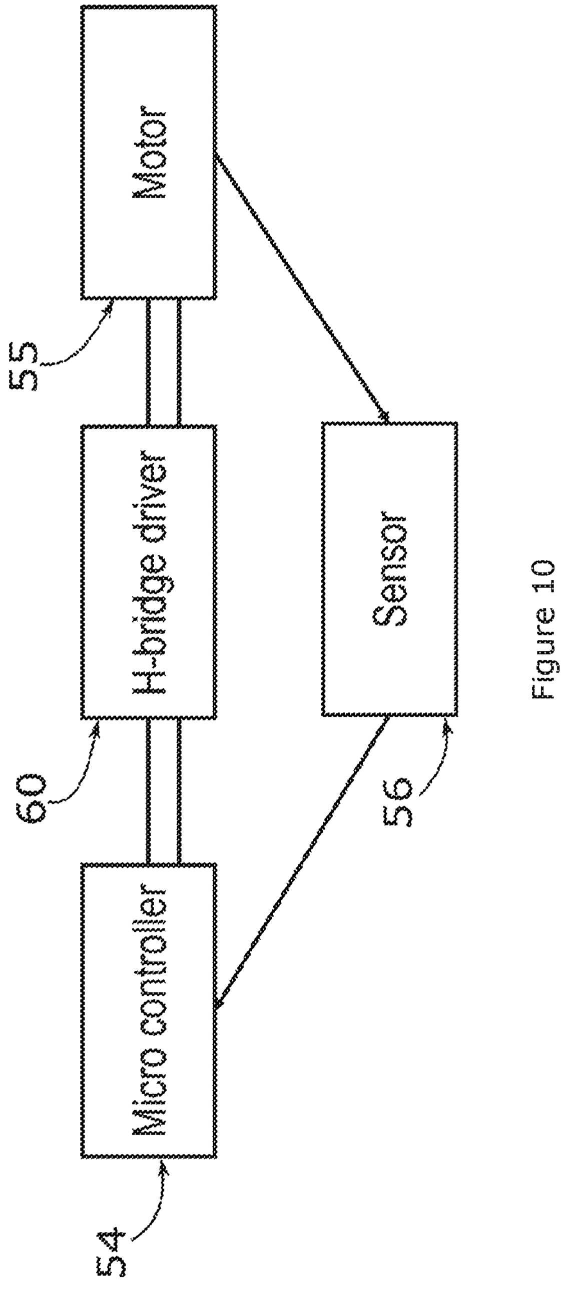

FIG. 10 shows an implementation of the actuation system for dispensing liquid. The microcontroller 54 runs the control sequence and makes decisions. The microcontroller sends signals to a motor driver, such as an H-bridge 60 which sends power to the motor 55 to drive it forwards or backwards as required. There is feedback from a sensor 56 attached to the output of the motor which feeds information back to the microcontroller. Alternatively, no feedback is required if the cam runs against end stops.

The invention claimed is:

1. A system for dispensing a pest attractant or repellent into a surrounding environment, comprising:

a main reservoir for storing a fluid;

a control volume coupled to the main reservoir;

a first flow restrictor arranged to regulate a flow of the fluid between the main reservoir and the control volume;

a second flow restrictor arranged to regulate a flow of the fluid out of the control volume;

an evaporation medium positioned at or downstream of the first flow restrictor; and a microcontroller, wherein the first flow restrictor is a controllable flow restrictor arranged to restrict the flow of fluid by compressing a flexible conduit containing the fluid, the controllable flow restrictor comprising a resilient member biased to compress the flexible conduit, wherein the system further comprises electronically controllable actuation means for actuating the controllable flow restrictor; and wherein the microcontroller is configured to control the electronically controllable actuation means to open the controllable flow restrictor and then close the controllable flow restrictor after a predetermined duration.

2. The system of claim 1, wherein the control volume is defined by a volume formed between the first and the second flow restrictors.

3. The system of claim 1, wherein the controllable flow restrictor is controllable between an open first position and a second position in which a flow of the fluid is restricted, wherein the second position is a closed position in which the fluid cannot flow through the controllable flow restrictor.

4. The system of claim 1, wherein both the first and the second flow restrictors are controllable flow restrictors.

5. The system of claim 1, wherein the controllable flow restrictor is a valve.

6. The system of claim 1, wherein the second flow restrictor comprises the evaporation medium and the evaporation medium is coupled to the surrounding environment, wherein the fluid is a liquid, and whereby in use the liquid evaporates from the evaporation medium into the surrounding environment.

7. The system of claim 6, wherein the evaporation medium defines the control volume.

8. The system of claim 1, wherein the second flow restrictor comprises the control volume.

9. The system of claim 1, wherein the main reservoir and the control volume are formed from a single flexible pouch, wherein the pouch comprises the evaporation medium.

10. The system of claim 1, wherein the main reservoir is connected to a dispensing tube, wherein the dispensing tube comprises the control volume.

11. The system of claim 1, wherein the main reservoir is pressurised.

12. The system of claim 1, wherein the second flow restrictor is adapted to regulate the flow of the fluid out of the control volume and into the surrounding environment.

13. The system of claim 1, wherein the control volume is coupled to the surrounding environment.

14. The system of claim 1, wherein the control volume is a fixed volume.

15. The system of claim 1, wherein the control volume is an adjustable volume, wherein the control volume is adjustable by adjusting a position of the first and/or the second flow restrictor.

16. The system of claim 1, further comprising means for electronically monitoring a volume of the fluid that is dispensed into the control volume, whereby the controllable flow restrictor is controllable based upon the monitored volume.

17. The system of claim 1, wherein the first and the second flow restrictors are connected in series.

18. The system of claim 1, further comprising one or more additional reservoirs comprising one or more respective additional fluids, wherein the one or more additional reservoirs are coupled to the system between the first and the second flow restrictors or after the second flow restrictor.

19. A method of dispensing a pest attractant or repellent fluid into a surrounding environment, comprising:

regulating, using a first flow restrictor, a flow of the fluid from a main reservoir containing the fluid to a control volume coupled to the main reservoir, the first flow restrictor being arranged to restrict the flow of fluid by compressing a flexible conduit containing the fluid, the first flow restrictor comprising a resilient member biased to compress the flexible conduit; and, regulating, using a second flow restrictor, a flow of the fluid from the control volume to the surrounding environment, wherein regulating the flow of the fluid from the main reservoir to the control volume comprises opening, by electronically controllable actuation means, the first flow restrictor and then closing the first flow restrictor after a predetermined duration to thereby dispense the fluid from the main reservoir to the control volume, or wherein regulating the flow of the fluid from the control volume to the surrounding environment comprises opening, by the electronically controllable actuation means, the second flow restrictor and then closing the second flow restrictor after a predetermined duration to thereby dispense the fluid from the control volume to the surrounding environment; and, wherein an evaporation medium is positioned at or downstream of the first flow restrictor.

20. The method of claim 19, further comprising:

reading input data; and determining, based on the input data, that the fluid needs to be dispensed.

21. The method of claim 19, wherein regulating the flow of the fluid from the control volume to the surrounding environment comprises evaporating the fluid.

* * * * *